No. 881,858. PATENTED MAR. 10, 1908.
R. W. E. HAYES.
DRAG BAR FOR CULTIVATORS.
APPLICATION FILED MAR. 19, 1907.
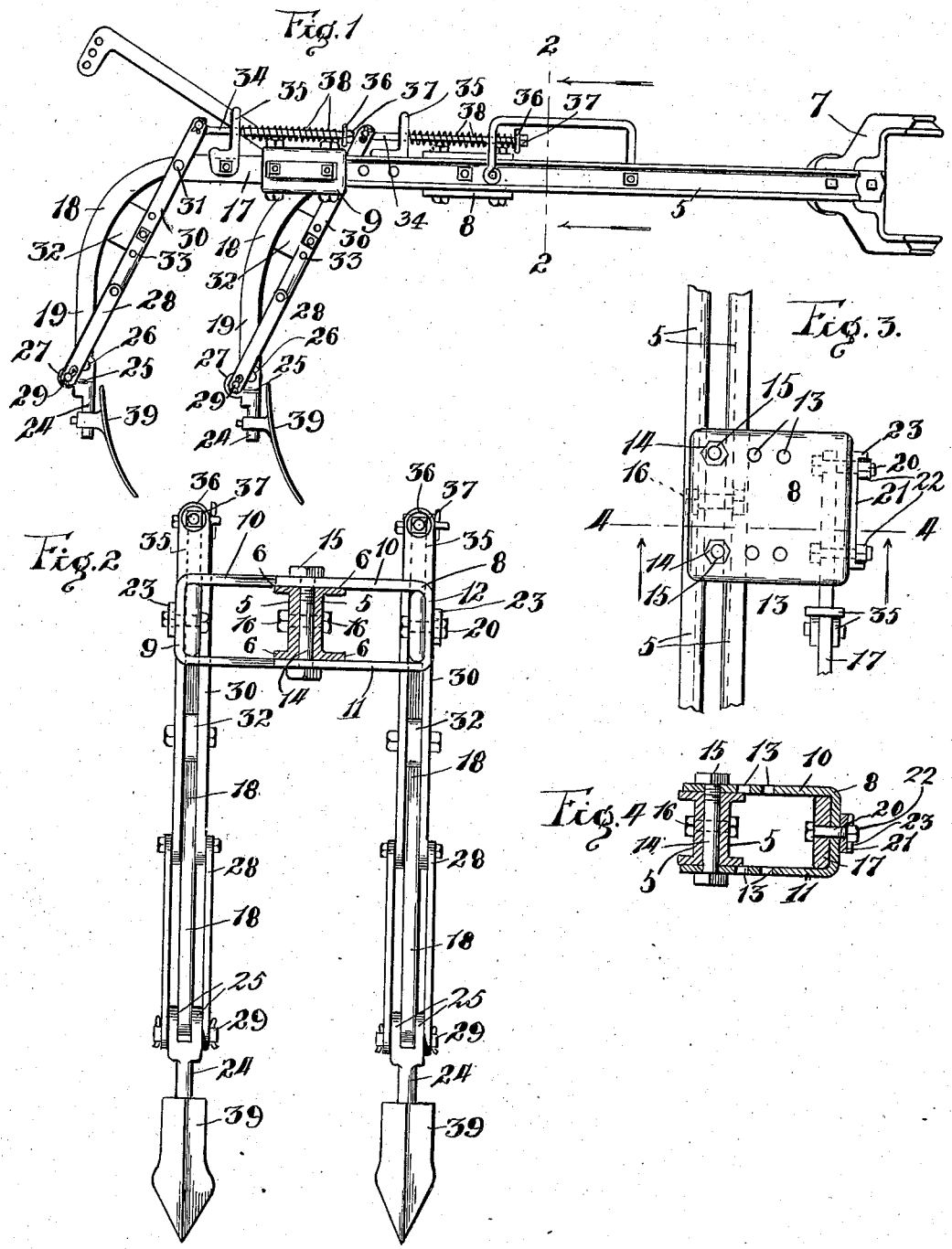
Witnesses:
Wm. P. Bond
C. F. Cooke
Inventor
Ralph W. E. Hayes
By Banning & Banning
Attys

UNITED STATES PATENT OFFICE.

RALPH W. E. HAYES, OF GALVA, ILLINOIS, ASSIGNOR OF ONE-HALF TO HAYES PUMP & PLANTER COMPANY, OF GALVA, ILLINOIS, A CORPORATION OF ILLINOIS.

DRAG-BAR FOR CULTIVATORS.

No. 881,858.  Specification of Letters Patent.  Patented March 10, 1908.

Original application filed February 13, 1906, Serial No. 300,846. Divided and this application filed March 19, 1907. Serial No. 363,210.

*To all whom it may concern:*

Be it known that I, RALPH W. E. HAYES, a citizen of the United States, residing at Galva, in the county of Henry and State of Illinois, have invented certain new and useful Improvements in Drag-Bars for Cultivators, of which the following is a specification, the same being a division of application Serial No. 300,846, filed February 13, 1906.

This invention relates more particularly to the construction of the drag bar and shovel supports for cultivators, and has for its object to provide means for adjusting the position of the shovel standards with respect to the drag bar; to provide a yieldable mounting for the shovels; to improve the construction and arrangement of the supporting means for attaching the shovel standards to the drag bar; to simplify the construction and arrangement of the clamping mechanism for holding the several parts of the structure together; and to improve generally the construction and arrangement of the drag bar and attached mechanism as a whole.

The invention consists in the features of construction and the combination of parts hereinafter described and claimed.

In the drawings Figure 1 is a side elevation of the drag bar of the present invention showing two shovel standards attached thereto; Fig. 2 a cross sectional view taken on line 2—2 of Fig. 1 looking in the direction of the arrows; Fig. 3 a plan view of one of the stirrups for attaching the shovel standard to a drag bar; and Fig. 4 a sectional view taken on line 4—4 of Fig. 3 looking in the direction of the arrows.

The drag bar as a whole comprises two beam sections 5 of channel formation, having outwardly extending flanges 6, and the beam sections, which extend in parallel relation, are spaced a sufficient distance apart to permit of the insertion of a bolt between them. The beam sections at their forward ends are secured to a pivotal yoke 7 which is adapted for attachment to the frame of a cultivator of any usual and well known character.

The beam sections are clamped in suitable relation to one another by means of forward and rear stirrup-shaped supporting plates 8 and 9 respectively. The stirrup-shaped plates are of identical construction and are set in opposite relation to each other on the sides of the drag bar, and are adjustable fore and aft thereon to meet the requirements of use. Each of the supporting plates comprises a top wall 10, a bottom wall 11, and an outer end wall 12, the inner end of the stirrup being open to embrace the beam sections of the drag bar. The upper and lower walls of the supporting plate are provided with a plurality of bolt holes 13 arranged, as shown, in two transversely extending rows, and the holes are intended to provide for the insertion of clamping bolts 14, which may be inserted through any pair of holes, depending upon the lateral adjustment intended. The bolts extend vertically between the beam sections and have on their ends nuts 15 which can be screwed down to clamp the open inner ends of the supporting plate against the top and bottom of the companion beam sections at any point along the drag bar desired. The vertical bolts coöperate with transversely extending bolts 16 which unite the two beam sections together, so that when the transverse bolts are tightened up the beam sections will be clamped together, and against lateral displacement on opposite sides of the vertical bolts, and clamped against vertical displacement by means of the top and bottom walls of the stirrup supporting plates. This unites the drag bar into an integral whole and at the same time permits an easy and rapid adjustment by loosening the bolts and permitting the stirrup supporting plate to be moved fore and aft as desired.

Each of the supporting plates has inserted thereinto the forward end 17 of a bow-shaped shovel standard 18 which terminates in a vertically extending lower end 19 for attachment of the shovel. The forward end 17 is of a suitable size to fit snugly between the top and bottom walls of the supporting plate, and is held in lateral contact with the inner face of the outer wall 12 to which it is secured by means of a pair of bolts 20. The outer ends of the bolts are passed through a reinforcing plate 21, and receive nuts 22, which are held against displacement by the contact of flanges 23 formed by bending or turning the ends of the plate 21, as best shown in Fig. 3. This arrangement provides a rigid socket for the end of the shovel standard and prevents the bolts being sheared off by any strain which may be brought to bear upon the implement.

The attaching end 19 of the shovel standard has secured thereto a stem 24 provided at its upper end with ears 25 adapted to embrace the end of the standard, and the ears are pivoted thereto by means of a pivot 26 which permits a fore and aft swinging movement of the stem. The stem is further provided behind and below the ears with a rearwardly extending tongue 27 on opposite sides of which are secured a pair of diagonally extending links 28 which are pivoted to the tongue by means of a pivot pin 29. The upper ends of the links are in turn pivoted to a pair of bars 30, which in turn are pivoted by means of a pin 31 on opposite sides of the upper or forwardly extending end of the shovel standard. The bars 30 have bolted thereto a stop block 32 which can be adjusted with respect to the bars by reason of the provision of a plurality of bolt holes 33, and this arrangement enables the stop block to be raised or lowered as may be required to furnish a normally straight line position for the links and bars 28 and 30, the stop block meanwhile bearing against the bowed portion of the shovel standard. The upper ends of the bars 30 which project above the shovel standard have pivoted thereto a forwardly extending rod 34 which passes through a guideway 35 and has at its forward end a washer 36 which is held in place by means of a nut 37 threaded onto the forward end of the rod. Between the guide and the washer is a spring 38 which is normally contracted, and exerts a forward thrust on the rod 34 with sufficient force to normally hold the links and bars in a straight line with one another. The stem 24 has secured thereto a shovel 39 of any ordinary character which can be raised or lowered and adjusted upon the stem as may be desired.

In use, after the desired position of the pair or gang of shovel standards has been determined, the shovel standards can be adjusted fore and aft by the clamping bolt mechanism with very great ease owing to the simplicity of the arrangement, and after the bars have been adjusted in the desired position the nuts can be screwed down on the bolts, which gives very great rigidity to the device. A lateral adjustment can likewise be made by shifting the stirrup in or out to the desired degree. By forming the drag bar in the manner specified the sections can be made of channel formation, which renders the structure exceedingly strong and rigid, and by forming the stirrup supporting plates in the manner indicated they can be made of plate steel and bent to shape, which renders them much stronger and more durable than if formed of cast material. By locating and securing the forward ends of the shovel standards in the manner indicated the entire strain will be brought to bear upon the upper and lower walls of the stirrup plate at the point of greatest rigidity, thereby relieving the bolts of all shearing strain, and centering the strain at the point of greatest strength and rigidity.

The shovels are so supported that under ordinary conditions the tension of the springs will be sufficient to hold them in normal position, but in case an obstruction is encountered the shovels will be swung back and the links and bars knuckled or swung forward out of a straight line position, against the tension of the spring, which yielding movement of the shovels lessens the danger of breakage due to obstructions.

What I regard as new and desire to secure by Letters Patent is:

1. The combination of a drag bar for cultivators comprising two beam sections having a space between them, a stirrup-shaped support having top, bottom and end walls, clamping bolts passing through the top and bottom walls and between the beam sections for rigidly clamping the sections together and permitting adjustment, and a shovel standard attached to the stirrup-shaped support, substantially as described.

2. The combination of a drag bar for cultivators comprising two beam sections having a space between them, a stirrup-shaped support having top, bottom and end walls, clamping bolts passing through the top and bottom walls and between the beam sections for rigidly clamping the sections together and permitting adjustment, and a shovel standard having its end entered between the top and bottom walls of the stirrup and rigidly secured to the end wall thereof, substantially as described.

3. The combination of a drag bar comprising two beam sections having a space between them, a stirrup shaped support having top, bottom and end walls, clamping bolts passing through the space between the two beam sections for rigidly securing the sections together and permitting adjustment, a shovel standard having its end entered within the stirrup and secured to the end wall thereof, a stem for a shovel, and a yieldable connection between the stem and the shovel standard, substantially as described.

4. The combination of a drag bar comprising two beam sections having a space between them, a stirrup-shaped support having top, bottom and end walls, a clamping bolt secured to the top and bottom walls and passing through the space between the beam sections, a transverse bolt for clamping the sections together, and a shovel standard attached to the stirrup-shaped support, substantially as described.

5. The combination of a drag bar comprising two beam sections having a space between them, a stirrup-shaped support having top, bottom and end walls and provided with a transversely extending row of adjusting holes in the top and bottom walls, a clamping bolt entered through companion holes in the top and bottom and through the space between the beam sections for permitting fore and aft and lateral adjustment of the stirrup support, and for clamping the parts in adjusted position, and a shovel standard attached to the stirrup-shaped support, substantially as described.

6. The combination of a drag bar comprising two beam sections having a space between them, a stirrup-shaped support having top, bottom and end walls and having a row of laterally extending holes in the top and bottom, a clamping bolt passing through coöperating holes in the top and bottom and through the space between the beam sections, a transversely extending bolt passing through the beam sections for coöperating with the first mentioned bolt to permit adjustment and clamp the parts in adjusted position, and a shovel standard attached to the stirrup-shaped support, substantially as described.

7. The combination of a drag bar comprising two beam sections of channel iron having their flanges turned away from one another and having a space between the sections, a stirrup-shaped support having top, bottom and end walls, clamping bolts passing through the top and bottom walls and through the space between the beam sections, a transversely extending bolt passing through the beam sections, a shovel standard having its forward end snugly fitted between the top and bottom walls and secured to the inner face of the end wall of the stirrup-shaped support, a stem pivoted to the lower end of the standard, a link pivoted to the stem behind the point at which the stem is pivoted, a bar pivoted at its lower end to the link and pivoted near its upper end to the standard, a rod forwardly extending from the upper end of the bar, a guideway on the standard through which the bar passes, a stop on the free end of the bar, and a coiled spring interposed between the stop and the guideway for normally exerting a forward pull on the rod and holding the link and bar in alinement with one another, substantially as described.

RALPH W. E. HAYES.

Witnesses:
LAWRENCE C. JOHNSON,
ISAAC GRANT.